United States Patent [19]
Langer

[11] 3,962,090
[45] June 8, 1976

[54] FILTER UNIT

[75] Inventor: Heinz Langer, Hargesheim, Germany

[73] Assignee: Seitz-Asbest-Werke Theo & Geo Seitz, Germany

[22] Filed: Sept. 12, 1972

[21] Appl. No.: 288,298

[30] Foreign Application Priority Data
Sept. 13, 1971 Germany............................ 2145661

[52] U.S. Cl................................. 210/231; 210/401
[51] Int. Cl.² .......................................... B01D 25/12
[58] Field of Search ............................ 210/227–231

[56] References Cited
UNITED STATES PATENTS
3,144,409  8/1964  Jauhola................................ 210/401
3,730,345  5/1973  Suzuki ................................. 210/231

FOREIGN PATENTS OR APPLICATIONS
1,075,013  10/1954  France................................ 210/231
1,143,088  9/1957   France................................ 210/231

Primary Examiner—Theodore A. Granger
Attorney, Agent, or Firm—Walter Becker

[57] ABSTRACT

A filtering unit which is used in filter presses having a plurality of filter elements, which filtering unit comprises at least two filtering layers which are connected by a seam, the latter being adapted to rest on the pertaining filter element, with the remainder of the filtering unit being adapted to hang along the sides of the pertaining filter element.

2 Claims, 3 Drawing Figures

U.S. Patent   June 8, 1976   3,962,090
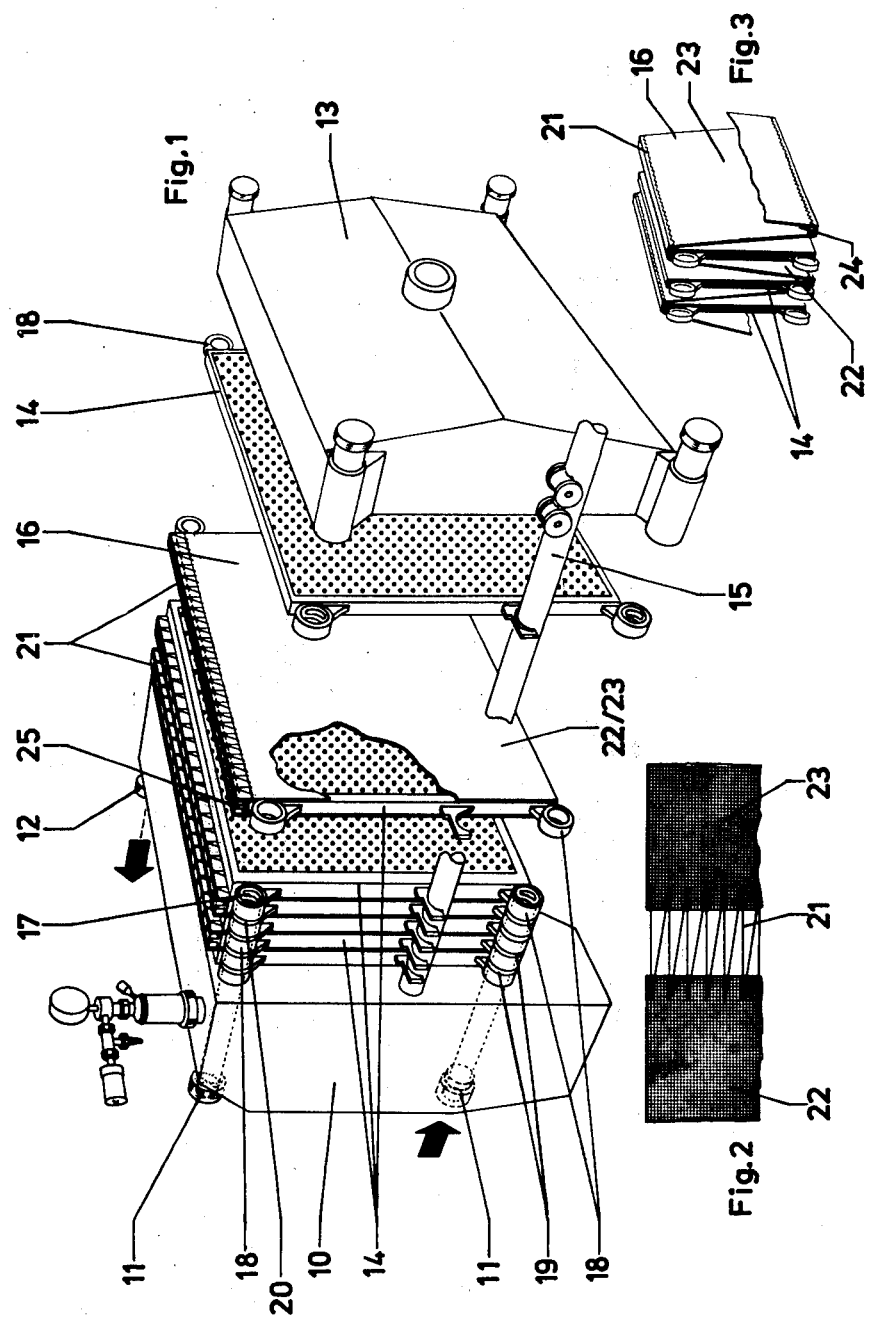

FILTER UNIT

The present invention relates to a method of making filtering layers, each of which consists of a back or seam and two symmetrical filter areas which are connected to said back or seam. When such filtering layer is in a filter press in its position of use, the filter areas are essentially perpendicular to the back of the filtering layer and extend to both sides of a filter element respectively along a side of the element.

It is known, with the afore-mentioned type of filtering layers, which are also known by the name "folding layers" and which represent large surface products of organic or inorganic fibers or any combination of these fibers, if desired with the addition of pulverous materials, to cut out such filtering layers in the form of articles each forming a single flat piece and being made out of a fiber length or web prepared on a Fourdrinier machine. The respectively cut out flat surface article has the dimensions of the two symmetrical filter areas and that of the back, which latter is made by a further manufacturing step, namely by providing grooves or folds. In many instances the back is provided with additional strengthening or reinforcing means.

When cutting the one piece flat surface article out of the fiber length or web, whose width is predetermined by the web width of the Fourdrinier machine, the requirement has to be met that the waste be at a minimum. The preferred cut off transverse to the fiber length or web is unsuitable with one piece flat surface articles, which are intended for large dimensioned filtering layers, in many instances due to the fact that the necessary overall dimensions exceed the width of the fiber length or web and the structures or articles must be cut out in the longitudinal direction of the length or web. The waste which results in this connection naturally raises the price of the layers, whose manufacture is moreover made more difficult owing to the changing cutting arrangement or cutting direction.

It is an object of the present invention to provide a method of making filtering layers of the above mentioned general type, which will eliminate the above mentioned drawbacks.

It is a further object of the invention to reduce the manufacturing costs of the filtering layers set forth above while simultaneously cutting down the manufacturing time of such layers.

These and other objects and advantages of the invention will appear more clearly from the following specification in connection with the accompanying drawing in which:

FIG. 1 is an isometric view of a portion of a filter press with a plurality of vertical filter elements and filtering layers of the invention associated therewith.

FIG. 2 is a detail view of a portion of a filtering layer according to the invention in spread out condition.

FIG. 3 shows several filtering layers according to the invention connected to each other so as to form one continuous strand or web.

The present invention is characterized primarily in that each two flat individual filtering layers, which form the symmetrical filter areas of a filtering unit, are connected to one another by a seam of thread or thin wire connected to those adjacent longitudinal edges of the filtering layers which protrude beyond the pertaining adjacent edges of the filter element. The seam forms a back section of the filtering unit and extends over all or almost all of the width of the layers. By the employment according to the invention of individual filtering layers, the overall dimensions of which in no instance exceed the width of the fiber length or web, even with the largest dimensions, the flat surface articles required for the folding sheets are easily detachable from the fiber length or web. In this connection, separating or cutting devices can be used which always cut perpendicular to the fiber length or web and are operable continuously. Furthermore, with a layer manufactured in this way, the individual filtering layers may be alternately interconnected by the seam in such a way that, with a layer which is in position of use, respectively the cloudy and filtrate side of the symmetrical filter areas composed of the individual filtering layers are directed towards or face away from each other. A further advantage of the filter layer consists in that, by means of the seam or back, stiffening means of the back required in most instances with heretofore known folding sheets are no longer necessary, and an unimpaired back strength results from the connecting seam. According to the invention, an overcasting or overstitching seam is preferred for the back which interconnects the individual filtering layers. With this overcasting seam, according to a further development of the invention, the width of the loop is selectable in conformity with the element thickness within the region of the outer element border. By this conformity of the back or seam to the element thickness according to the invention, it will be assured that the filter areas of the layer respectively extend freely along the sides of the element, and that in closed condition of the filter press, the layers are not curved or bent.

For use in filter presses employing vertical filter elements, it is suggested according to the invention, for a filter layer manufactured in conformity with the method according to the invention, to provide a back or seam which interconnects the two individual filtering layers at the adjacent longitudinal edges which extend beyond the upper horizontal border of the filter element and is supportable upon the edge of the upper horizontal end border of the element or upon a seat fastened to the element edge in such a way that the individual filter layers are respectively freely suspended on both sides of the filter element. According to a further embodiment of the invention it is expedient, not only for filter presses with vertical filter elements but also for filter presses with horizontal filter elements, to combine or connect a plurality of the thus manufactured filtering layers into a finite or endless strand or web. To this end, those edges of oppositely located individual filtering layers which are located opposite the respective back are connected by seams.

Referring now to the drawing in detail, the partially illustrated large dimensioned horizontal filter press has a stationary end plate 10, which is provided with a fluid inlet 11 and a fluid outlet 12, and an opposite movable end plate 13 which is operable by a not shown pressing apparatus. A plurality of vertical filter elements 14 are arranged in a space between the end plates 10 and 13 and are supported by parallel spars 15. The elements 14 may be composed of plates, frames or the like and, in a closed press, together with large surface filtering layers 16 form a filter packet. The filtering layers 16 are inserted between said filter elements 14. With such a filter packet, eyes 18 located on the elements 14, generally in the upper and lower region thereof and provided with passages 17, together with seals or washers 19 form conduits 20. These conduits 20 supply turbid fluid to the filter elements and carry the fluid off as filtrate after passage through the filtering layers 16.

These filtering layers 16 represent so called folding layers, each of which is composed of a back or seam 21 and two flat or plane individual filtering layers 22, 23 which form the symmetrical filter areas (FIG. 2). The back or seam 21, which connects individual filtering layers 22, 23 and expediently is formed out of an overcasting or overstitching seam, is respectively mounted on opposite side edges of the individual filtering layers 22, 23 which together rise beyond an outer boundary of a filter element. To this end, the back or seam 21 may extend entirely over or nearly over the width of the layers, and the loop width of the back or seam 21 may be selected in conformity with the element thickness in the region of the outer element border. With a favored use of a sewing machine of this stitch type, the individual filtering layers 22, 23 are, during the sewing operation, located in pairs on top of one another with their connecting edges directed parallel to one another. With a ready to use layer 16, not only for filter presses with vertical filter elements but also for filter presses with horizontal filter elements, the individual filtering layers 22, 23 are arranged essentially perpendicular to the back 21 and extend to both sides of a filter element respectively along an element side.

In filter presses with vertical filter elements, as shown in FIG. 1, the back or seam 21 of a filter layer 16, which back or seam 21 is composed of an overcasing or overstitching seam, is mounted on those side edges of the two individual filtering layers 22, 23 which extend beyond the upper horizontal border of a filter element 14. The layers 16 are themselves associated with those filter elements 14 which within the filter packet respectively follow a free filter element. The layer 16 hangs over the respectively pertaining or associated filter element 14. In this connection the loop width of the back or seam 21 is chosen in such a way that it rests upon the edge of the upper horizontal end border of the filter element 14 or upon a support 25 which is fastened to the element edge and that the individual filtering layers 22, 23 always hang freely at both sides of the filter element 14. In an analogous construction the filtering elements made in this way are also usable in filter presses having horizontal filter elements.

It may be expedient, not only for filter presses with vertical filter elements but also for filter presses with horizontal filter elements, to connect a plurality of filtering layers 16 into a finite or endless strand or web. As illustrated in FIG. 3, for this purpose those longitudinal edges of individual filtering layers 22, 23 of adjacent layers 16 which are located opposite each other and which are remote from the back or seam 21, are respectively interconnected by means of a seam 24, and the layers 16 of the strand or web are likewise hung over the filter element 14.

It is, of course, to be understood that the present invention is by no means limited to the specific showing in the drawing but also comprises any modifications within the scope of the appended claims.

What I claim is:

1. A filtering unit for a filter press having vertical filter elements comprising two individual soft filtering layers arranged on each side of a filtering element with longitudinal edges parallel and spaced by a side of the filter element, and a seam formed of stitching spanning the space between and connecting said spaced edges, so that said seam overlies the side of said filtering element and the edges of said layers do not extend beyond the filtering element.

2. A filtering unit in combination according to claim 1, which includes at least four successively arranged filtering layers, each of said filtering layers having one longitudinal edge thereof connected by a seam to the spaced corresponding adjacent longitudinal edge of the directly preceding filtering layer and having the opposite longitudinal edge thereof connected by a seam to the spaced corresponding adjacent longitudinal edge of the directly successive filtering layer.

* * * * *

UNITED STATES PATENT OFFICE
CERTIFICATE OF CORRECTION

Patent No. 3,962,090  Dated June 8, 1976

Inventor(s) Heinz Langer

It is certified that error appears in the above-identified patent and that said Letters Patent are hereby corrected as shown below:

--[73] Assignee:  Seitz-Asbest-Werke Theo & Geo
Seitz, Bad Kreuznach, Germany   --.

Signed and Sealed this

Nineteenth Day of October 1976

[SEAL]

Attest:

RUTH C. MASON
*Attesting Officer*

C. MARSHALL DANN
*Commissioner of Patents and Trademarks*